(12) United States Patent
Wolf et al.

(10) Patent No.: US 12,340,022 B2
(45) Date of Patent: Jun. 24, 2025

(54) HAPTIC FEEDBACK DEVICE AND A METHOD OF CONTROLLING SAME

(71) Applicant: TECHNION RESEARCH & DEVELOPMENT FOUNDATION LIMITED, Haifa (IL)

(72) Inventors: Alon Wolf, Haifa (IL); Lihi Zelnik-Manor, Haifa (IL); Yair Herbst, Haifa (IL); Yoni Chechik, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 0 days.

(21) Appl. No.: 18/277,665

(22) PCT Filed: Feb. 17, 2022

(86) PCT No.: PCT/IL2022/050190
§ 371 (c)(1),
(2) Date: Aug. 17, 2023

(87) PCT Pub. No.: WO2022/175950
PCT Pub. Date: Aug. 25, 2022

(65) Prior Publication Data
US 2024/0134456 A1    Apr. 25, 2024
US 2024/0231494 A9    Jul. 11, 2024

Related U.S. Application Data

(60) Provisional application No. 63/150,666, filed on Feb. 18, 2021.

(51) Int. Cl.
*G06F 3/01*    (2006.01)
*A63F 13/285*    (2014.01)
*G09B 21/00*    (2006.01)

(52) U.S. Cl.
CPC .......... *G06F 3/016* (2013.01); *A63F 13/285* (2014.09); *G09B 21/003* (2013.01)

(58) Field of Classification Search
None
See application file for complete search history.

(56) References Cited

U.S. PATENT DOCUMENTS 10,292,780 B2    5/2019    Park
2001/0043847 A1    11/2001    Kramer
(Continued)

FOREIGN PATENT DOCUMENTS

EP    1319214 B1    6/2004
EP    1830243 A1    9/2007
(Continued)

OTHER PUBLICATIONS

Johnansson RS, Flanagan JR. Coding and use of tactile signals from the fingertips in object manipulation tasks. Nat Rev Neurosci. May 2009;10(5):345-59. doi: 10.1038/nrn2621. Epub Apr. 8, 2009. PMID: 19352402.
(Continued)

*Primary Examiner* — Christopher J Kohlman
(74) *Attorney, Agent, or Firm* — The Roy Gross Law Firm, LLC; Roy Gross

(57) ABSTRACT

A haptic feedback device is disclosed. The haptic feedback device may include at least one texture emulator; a housing at least partially containing the texture emulator; and a controller configured to: receive instructions to provide a texture sensation; and control the texture emulator to apply force to at least one location on a surface based on the received instructions.

17 Claims, 7 Drawing Sheets

(56) References Cited

U.S. PATENT DOCUMENTS

| | | |
|---|---|---|
| 2008/0252607 A1 | 10/2008 | De Jong et al. |
| 2009/0250267 A1 | 10/2009 | Heubel et al. |
| 2018/0067543 A1 | 3/2018 | Sinclair et al. |
| 2018/0120982 A1* | 5/2018 | Colgate ............... G06F 3/0362 |
| 2018/0157317 A1* | 6/2018 | Richter ............... G06T 19/006 |
| 2020/0211418 A1 | 7/2020 | Greiner |
| 2021/0096649 A1* | 4/2021 | Mok ..................... G06F 3/016 |

FOREIGN PATENT DOCUMENTS

| | | |
|---|---|---|
| EP | 3037144 A1 | 6/2016 |
| KR | 20200015648 A | 2/2020 |
| WO | 2014189195 A1 | 11/2014 |

OTHER PUBLICATIONS

F. Chinello, C. Pacchierotti, M. Malvezzi and D. Prattichizzo, "A Three Revolute-Revolute-Spherical Wearable Fingertip Cutaneous Device for Stiffness Rendering," in IEEE Transactions on Haptics, vol. 11, No. 1, pp. 39-50, Jan. 1-Mar. 2018, doi: 10.1109/TOH.2017.2755015.

N. Nishimura, D. Leonardis, M. Solazzi, A. Frisoli and H. Kajimoto, "[D08] Wearable encounter-type haptic device with 2-DoF motion and vibration for presentation of friction," 2014 IEEE Haptics Symposium (HAPTICS), Houston, TX, USA, 2014, pp. 1-1, doi: 10.1109/HAPTICS.2014.6775537.

S. A. Brewster, S. A. Wall, L. M. Brown, and E. E. Hoggan, "Tactile Displays," in The Engineering Handbook of Smart Technology for Aging, Disability, and Independence, 2008, pp. 339-352. DOI: 10.1002/9780470379424.ch18.

Herbst, Y., Zelnik-Manor, L., & Wolf, A. (2020). OSF | BRML Grasp Dataset. OSFHome. https://doi.org/10.17605/osf.io/xj6dw.

Herbst Y, Zelnik-Manor L, Wolf A (2020) Analysis of subject specific grasping patterns. PloS ONE 15(7): e0234969. https://doi.org/10.1371/journal.pone.0234969.

R. Mechrez, I. Talmi, F. Shama, L. Zelnik-Manor. (2018) Maintaining Natural Image Statistics with the Contextual Loss. arXiv: 1803.04626.

PCT International Search Report for International Application No. PCT/IL2022/050190, mailed Jul. 14, 2022, 5pp.

PCT Written Opinion for International Application No. PCT/IL2022/050190, mailed Jul. 14, 2022, 6pp.

PCT International Preliminary Report on Patentability for International Application No. PCT/IL2022/050190, issued Aug. 22, 2023, 7pp.

Carvalho, J. (Dec. 31, 2021). Sony working on Player-Specific haptic feedback system. Game Rant. https://gamerant.com/sony-player-specific-haptic-feedback-system-patent/.

Textures for 3D, graphic design and Photoshop! (2005). Textures for 3D, Graphic Design and Photoshop! Available online: [https://www.textures.com/].

Jones, L. & Lederman, S. (2006). Human Hand Function. 10.1093/acprof:oso/9780195173154.001.0001.

S. Okamoto, H. Nagano and Y. Yamada, "Psychophysical Dimensions of Tactile Perception of Textures," in IEEE Transactions on Haptics, vol. 6, No. 1, pp. 81-93, First Quarter 2013, doi: 10.1109/TOH.2012.32.

V. Yem and H. Kajimoto, "Wearable tactile device using mechanical and electrical stimulation for fingertip interaction with virtual world," 2017 IEEE Virtual Reality (VR), Los Angeles, CA, USA, 2017, pp. 99-104, doi: 10.1109/VR.2017.7892236.

Bansal A, Chen X, Russell B, Gupta A, Ramanan D. Pixelnet: Representation of the pixels, by the pixels, and for the pixels. arXiv Prepr arXiv170206506. 2017.

X. Wang, D. F. Fouhey and A. Gupta, "Designing deep networks for surface normal estimation," 2015 IEEE Conference on Computer Vision and Pattern Recognition (CVPR), Boston, MA, USA, 2015, pp. 539-547, doi: 10.1109/CVPR.2015.7298652.

Mechrez, R., Shechtman, E. & Zelnik-Manor, L. Saliency driven image manipulation. Machine Vision and Applications 30, 189-202 (2019). https://doi.org/10.1007/s00138-018-01000-w.

Pacchierotti C, Sinclair S, Solazzi M, Frisoli A, Hayward V, Prattichizzo D. Wearable Haptic Systems for the Fingertip and the Hand: Taxonomy, Review, and Perspectives. IEEE Trans Haptics. Oct. 2017-Dec. 10(4):580-600. doi: 10.1109/TOH.2017.2689006. Epub May 9, 2017. PMID: 28500008.

Wang Z, Cao J, Hao Q, Zhang F, Cheng Y, Kong X. Super-resolution imaging and field of view extension using a single camera with Risley prisms. Rev Sci Instrum. Mar. 2019;90(3):033701. doi: 10.1063/1.5050833. PMID: 30927812.

Lund, Arnold. (2001). Measuring Usability with the USE Questionnaire. Usability and User Experience Newsletter of the STC Usability SIG. 8.

\* cited by examiner

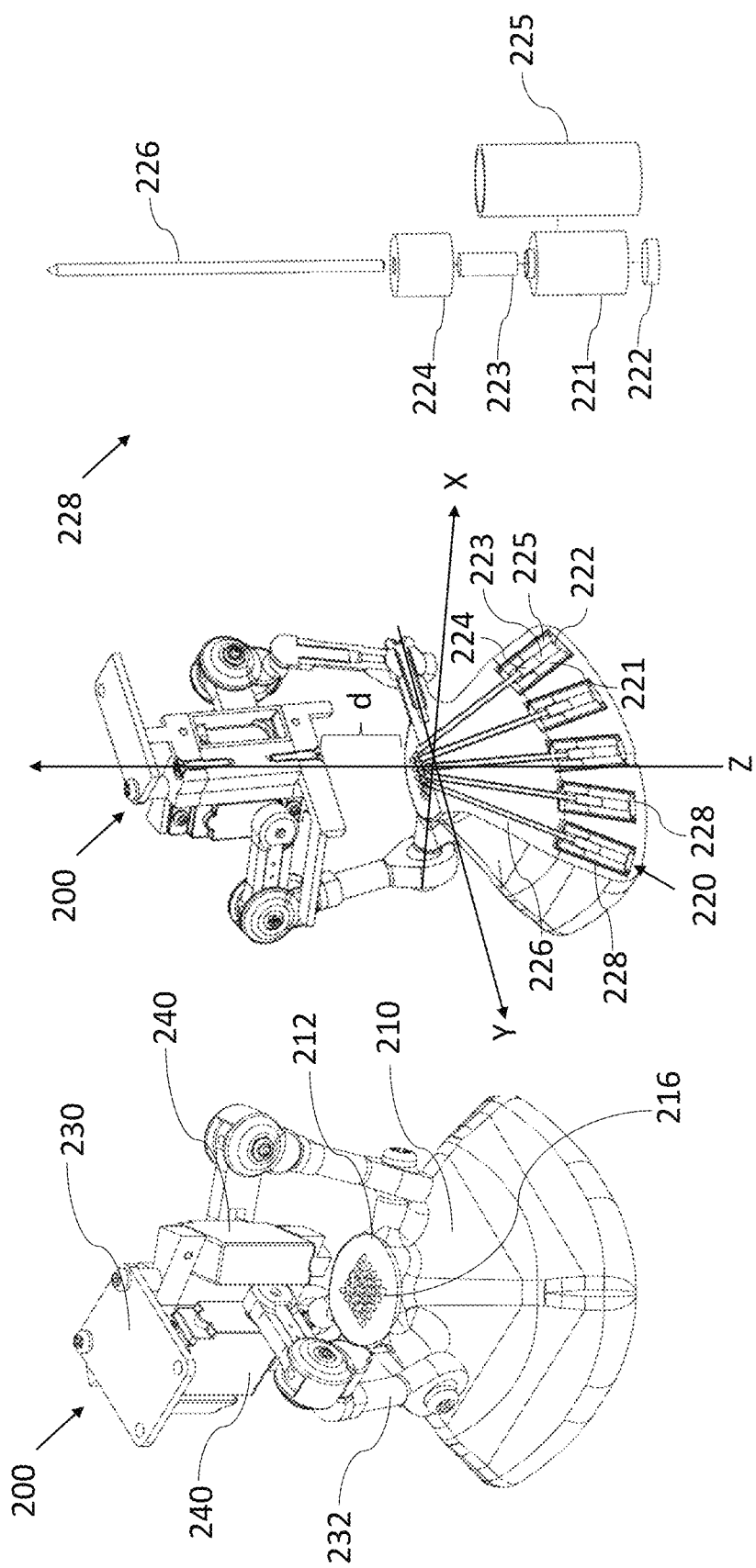

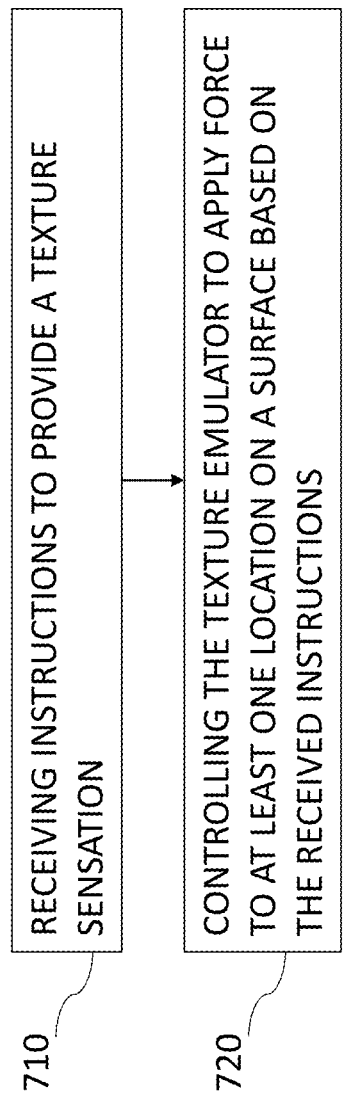

HAPTIC FEEDBACK DEVICE AND A METHOD OF CONTROLLING SAME

CROSS REFERENCE TO RELATED APPLICATIONS

This application is a National Phase of PCT Application No. PCT/IL2022/050190 having International filing date of Feb. 17, 2022 which claims the benefit of priority under 35 U.S.C. § 119 (e) of U.S. Provisional Patent Application No. 63/150,666, filed Feb. 18, 2021, entitled "HAPTIC FEEDBACK DEVICE AND A METHOD OF CONTROLLING SAME". The contents of the above applications are all incorporated by reference as if fully set forth herein in their entirety.

FIELD OF THE INVENTION

The present invention relates generally to feedback devices. More specifically, the present invention relates to haptic feedback devices and to methods of controlling same.

BACKGROUND

Virtual and Augmented Reality are both rapidly developing fields that are estimated to be incorporated in numerous aspects of our lives. While the visual and auditory feedback provided by the headsets have progressed greatly, accompanying devices for haptic feedback are still limited in their capabilities and are mostly aimed at tackling individual aspects of the human haptic\tactile perception.

The human tactile perception can be generated by a combination of four types of mechanoreceptors lying in different depths relative to the skin surface. A combination of these four types of mechanoreceptors results in all known dimensionalities of mechanical perception: hardness, friction, warmness, macro roughness and fine roughness.

As mentioned above, existing devices for haptic feedback suffer from lack of Degrees of Freedom (DoF), are cumbersome and are mostly aimed at solving one aspect of human haptic perception. Such devices include surface orientation and normal force feedback, normal and shear forces and tactile displays. Furthermore, existing devices are usually bulky and typically are not wearable. Thus, such devices are limited in their applications.

SUMMARY

Aspects of the invention may be directed to a haptic feedback device, the haptic feedback device may include at least one texture emulator; a housing at least partially containing the texture emulator; and a controller configured to: receive instructions to provide a texture sensation; and control the texture emulator to apply force to at least one location on a surface based on the received instructions.

According to some aspects, the at least one texture emulator comprises: an array of actuators, each configured to provide a linear stroke to a haptic rod. According to some aspects the housing is configured to hold the array of actuators and rods, allowing each rod to extend from an opening in a surface of the housing when provided with a linear movement. In some embodiments, the controller is configured to control one or more actuators from the array to provide required strokes.

According to some aspects of the present invention, each actuator in the array is located at a known location in the array and designed to provide the linear movement in specific angle with respect to the surface. The controller may be configured to determine linear movements for at least some of the actuators in the array based on the received texture sensation; and control at least some of the actuators in the array to provide one or more linear movements to form the sensation of the required texture.

According to some aspects, each actuator may comprise: a metallic coil; a static magnet; a floating magnet; a static cover attached to the static magnet; and an anti-magnetic cover attached to the floating magnet and configured to be connected to the haptic rod.

The actuators, according to some embodiments, may provide a predetermined frequency, for example, up to 200 Hz The haptic feedback device according to some embodiments, may further comprise a flexible layer, connected to three DC motors, and may be designed to cover the tips of the haptic rods.

According to some aspects of the invention the housing may include a plurality of micro-holes; and the at least one texture emulator may include: a plurality of tubes, each tube is connected from one end to one of the micro-holes in the housing and from the other end to a valve; and a pressurized gas supplier configured to supply pressurized gas to each tube. A controller may be configured to control one or more of the valves to provide gas to be ejected from one or more of the micro-holes according to the received instructions.

The texture emulator, according to some aspects of the invention, may comprise: a contact surface; and a vibration motor connected to the contact surface. A controller may be configured to control a frequency and amplitude of the vibration motor based on the received instructions.

The haptic feedback device according to some aspects, may further comprise, at least, a three degrees of freedom (DoF) manipulator configured to manipulate the housing to apply surface orientation and normal forces to a surface of a user, such as a finger cushion. The DoF manipulator may include: two or more arms pivotally connected to the housing and configured to apply normal force and to rotate the surface of the housing around axes parallel to the surface of the housing.

The haptic feedback device according to some embodiments may be mounted on a computer input device, selected from: a computer mouse, a keyboard, and a joystick.

According to some aspects of the invention, the haptic feedback device may further include a motion tracking glove, and the at least one texture emulator may be mounted on one or more fingers of the glove.

Further disclosed herein is a method, according to some aspects of the present invention, of controlling a haptic feedback device, the method may include receiving instructions to provide a texture sensation; and controlling a texture emulator, included in the haptic feedback device, to apply force to at least one location on a surface based on the received instructions, the haptic feedback device may include at least one texture emulator; a housing at least partially containing the texture emulator; and a controller.

According to some aspects, the instructions may be received from an external computing device.

The method according to some embodiments may further comprise controlling a three degrees of freedom (DoF) manipulator, included in the haptic feedback device, to apply surface orientation and normal forces to a surface.

Aspects of the present invention may be directed to a texture emulator, comprising of: a texture emulating surface; an array of actuators, each configured to provide a linear stroke to a respective haptic rod, wherein the haptic rod is configured to provide a sensation of texture, and wherein each rod extends from an opening in the texture emulating surface when provided with a linear movement.

According to some aspects of the present invention, each actuator in the array may be located at a known location in the array and designed to provide the linear movement in a specific angle with respect to the texture emulating surface.

According to some aspects of the present invention, each actuator of the comprises: a metallic coil, a static magnet; a floating magnet; a static cover attached to the static magnet; and an anti-magnetic cover attached to the floating magnet and configured to be connected to the haptic rod. According to some aspects of the invention, the actuators may provide a frequency of up to 200 Hz.

Aspects of the present invention may be directed to a texture emulator, comprising: a texture emulating surface; a plurality of tubes, wherein each tube may be connectable from one end to micro-holes in the texture emulating surface and from the other end to a valve; and a pressurized gas supplier configured to supply pressurized gas to each tube.

Aspects of the present invention may be directed to a texture emulator, comprising: a controller; a contact surface; and a vibration motor connected to the contact surface, wherein the controller is configured to control a frequency and amplitude of the vibration motor based on received instructions.

According to some aspects of the invention, said texture emulator may be capable of being mounted to at least one of: a motion tracking glove, a computer mouse, a keyboard, and a joystick.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIGS. 2A and 2B show illustrations of a haptic feedback device according to some embodiments of the present invention;

FIG. 2C is an illustration of components of an actuator, according to some embodiments, included in the haptic feedback device illustrated in FIGS. 2A and 2B;

FIG. 7 is a flowchart of a method of controlling a haptic feedback device according to an embodiment of the present invention.

Figure 1:
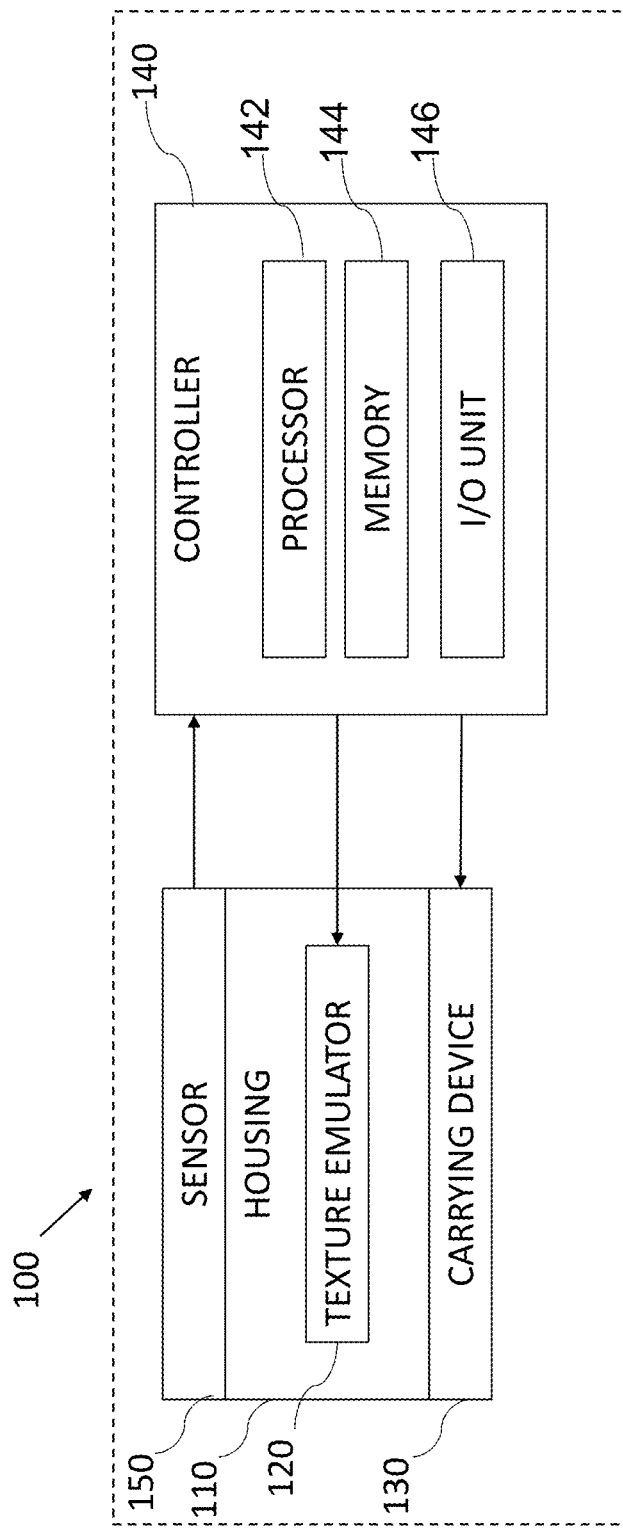
FIG. 1 is a diagrammatic representation of a haptic feedback device according to some embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Aspects of the invention may be directed to a haptic feedback device that is configured to provide to a user a texture sensation. The device may stimulate a user's mechanoreceptors to cause the texture sensation. Such a device may be wearable (e.g., on the user's hand/specific finger) and/or may be carried or attached to an input unit, such as, a computer mouse, a joystick, a keyboard and the like. Therefore, a device according to embodiments of the invention may be compact (e.g., in a size suitable to be carried for example as part of a glove, a computer mouse and the like).

As used herein, a "texture emulator" refers to any device that is configured to provide a texture sensation to a user touching the device. The texture emulator may include at least one texture emulating surface that provides the texture sensation using one or more texture emulating elements that are configured to apply controlled shear and/or normal force on a body part of the user (e.g., finger, hand, etc.). Some nonlimiting examples for texture emulators are given herein below with respect to FIGS. 2-5.

Reference is now made to FIG. 1 which is a diagrammatic representation of a haptic feedback device 100 according to some embodiments of the invention. Device 100 may include a housing 110, at least one texture emulator 120 and a controller 140. Housing 110 may at least partially contain texture emulator 120. Texture emulator 120 may be configured to provide a texture sensation to an external surface, for example, a finger cushion of a user.

Texture emulator 120 may be used to provide a sensation of texture to an external surface. In some embodiments, texture emulator 120 may comprise of a texture emulating surface, capable of communicating texture sensations to an external surface which contacts with the base plate. In some embodiments, said communication is intended for the external surface (e.g., finger cushion of a user) to be able to distinguish individual texture sensations. In some embodiments, said communication to the external surface may be comprised of a haptic rod assembly, a gas tube assembly, or a vibration motor assembly, further illustrated and discussed herein with respect to FIGS. 2-5. In some embodiments, said assemblies may receive a signal from controller 140 containing, inter alia, a predetermined texture, and may communicate said texture to the external surface by, for example, actuating rods in contact with the external surface, ejecting pressurized gas from a plurality of tubes, or vibrating a surface, further illustrated and discussed herein below with respect to FIGS. 2-5.

Controller 140 may be configured to perform methods according to embodiments of the invention, for example, the method described with reference to FIG. 7 below. In some embodiments, controller 140 may include a processor 142 for example, a central processing unit processor (CPU), a chip or any suitable computing or computational device, a memory 144 and an input/output unit 146. Memory 144 may be any medium configured to store thereon instructions and/or data related to controlling a haptic feedback device. For example, memory 144 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units.

Input/output unit 146 may be or may include any suitable input devices, components or systems, e.g., a detachable keyboard or keypad, a mouse and the like. Input/output unit 146 may be or may include any suitable output devices, for example, one or more (possibly detachable) displays or monitors, speakers and/or any other suitable output devices in addition to haptic feedback device 100 and/or texture emulator 120 that provide output based on instructions received from controller 140.

In some embodiments, controller 140 may receive instructions (e.g., form an external computing device) to provide a texture sensation and further may control various controllable components of at least one texture emulator 120 according to the received instructions, as discussed in detail with respect to the flowchart of FIG. 6.

In some embodiments, at least one housing 110 and at least one texture emulator 120 may be attached/carried by carrying device 130. Carrying device 130 may be configured to move housing 110 and at least one texture emulator 120 in at least two axes, thus may allow providing additional hepatic sensation to the user (e.g., normal force and orientation), as illustrated and discussed with respect to FIGS. 2A and 2B. Carrying device 130 may be configured to be worn by a user (e.g., glove) as shown and discussed with respect to FIGS. 4A and 4B. Carrying device 130 may be a computer input device, selected from: a computer mouse (shown and discussed with respect to FIGS. 5A and 5B), a keyboard, a joystick and the like.

In some embodiments, device 100 may include one or more sensors 150, for example, a motion detector included in carrying device 130 (e.g., a mouse, a joystick, motion tracking glove, etc.). In some embodiments, at least one force sensor may be included in the one or more sensors 150, as discussed with respect to FIGS. 4A and 4B.

Reference is now made to FIGS. 2A and 2B which are illustrations of a nonlimiting example for a haptic feedback device 200, according to some embodiments of the invention. Haptic feedback device 200 may include at least one texture emulator 220 and a housing 210 at least partially contains texture emulator 220. In some embodiments, device 200 may further include a controller (not illustrated), the controller may be, for example, controller 140 (in FIG. 1). In some embodiments, at least one texture emulator 220 may include an array of actuators 228 (e.g., a 5×5 array with a 2 mm distance between each actuator 228), each configured to provide a linear stroke to a haptic rod 226. In some embodiments, housing 210 is configured to hold the array of actuators 228 and rods 226, allowing each rod 226 to extend from an opening 216 in a texture emulating surface 212 of housing 210 when provided with a linear movement, as shown in FIG. 2B. In some embodiments, the controller may be configured to control one or more actuators 228 from the array to provide the required linear movements. A nonlimiting example for an actuator 228 according to some embodiment of the invention is given herein below with respect to FIG. 2C.

In some embodiments, the at least some actuators 228 in the array may provide different linear movements (e.g., up to 3 mm) to the corresponding rods 226, allowing the array to form a complex texture. In order to further increase the ability of texture emulator 220 to provide complex texture, each actuator 228 in the array may be located at a known location in the array and designed to provide the linear movement in specific angle with respect to texture emulating surface 212.

In some embodiments, texture emulator 220 may further include two solenoid actuators (illustrated and discussed with respect to FIGS. 6A and 6B), that may create the sensation of shear forces by applying forces parallel to a plane of a finger (e.g., a finger cushion) placed on surface 212 in two perpendicular axes. In some embodiments, the tips of rods 226 may be covered by a flexible layer (illustrated and discussed with respect to FIGS. 6A and 6B) attached to three DC motors thus capable of moving in two directions parallel to the plane of the finger (or any other surface of contact with the user's body), while allowing rods 226 to freely move in response to a linear movement provided by actuators 228. The flexible layer may provide shear texture sensation to the user.

In some embodiments, the controller (e.g., controller 140) may be configured to determine linear movements for at least some of actuators 228 in the array based on the received texture sensation and to control at least some of the actuators 228 in the array to provide one or more linear movements to form the sensation of the required texture.

In some embodiments, haptic feedback device 200 may further include a three degrees of freedom (DoF) manipulator 230 (e.g., a carrying device) configured to apply surface orientation and normal forces to texture emulating surface 212 of housing 210. In some embodiments, the DoF manipulator may include two or more arms 232 (e.g., the three arms illustrated) pivotally connected to housing 210 and configured to apply normal force and to rotate surface 212 of the housing around axes parallel to texture emulating surface 212. In some embodiments, each arm may be driven by at least one respective DC motor 240 (for example, servo motors). In some embodiments, manipulator 230 output may include the orientation around axes X and Y (in FIG. 2B) and a translation of texture emulating surface 212 (and of housing 210) along axis Z, to change the distance d between surface 212 and manipulator 230. The output may be denoted by $\vec{\zeta} = (P_z, \phi, \theta)$. The orientations ($\phi$, $\theta$) provide the surface orientation sensation and the translation $P_z$ simulates the normal reaction force.

As should be understood by one skilled in the art, manipulator 230 may be coupled to any texture emulator according to any embodiments of the invention, for example, texture emulators 120, 220, 320, 420 and 520 illustrated in FIGS. 1, 2A, 3A, 4A and 5A. The invention is not limited to the specific example illustrated in FIGS. 2A and 2B.

Reference is now made to FIG. 2C which is an illustration of a nonlimiting example of an actuator 228 according to some embodiments of the invention. Actuator 228 (also illustrated in FIG. 2B) may include a metallic coil 221, a static magnet 222, a floating magnet 223, a static cover 224 attached to static magnet 222, an anti-magnetic cover 225, a floating magnet 223, and a haptic rod 226. In some embodiments, an actuating force is created when metallic coil 221 (e.g., copper coil) creates a magnetic force acting on floating magnet 223. Static magnet 222 may be attached to the base of coil 221 in order to create a constant magnetic field that repels floating magnet 223. In some embodiments, actuator 228 may be covered with static cover 224 (e.g., a 3D printed piece) that may allow a 3 mm stroke.

In some embodiments, the controller may control the intensity and direction of current flowing in coil 221, thus may allow to either counteract the static magnetic field and pull floating magnet 223 towards static magnet 222 or enhance the static magnetic field to push floating magnet 223 out by force. The described design may allow the device to reach frequencies of up to 200 Hz with a push force of up to 1N while maintaining low weight and low power consumption thus allowing the device to be mounted on a fingertip. The magnets and coil were chosen to achieve the above-mentioned values which may be suitable for sensation by the different mechanoreceptors in the human skin. In some embodiments, the device may be capable of simulating a wide range of surfaces. The high frequency e.g., between 100 Hz and 200 Hz and low strokes (e.g., less than 1 mm) may be suitable for emulating micro textures and the lower frequencies (e.g., less than 100 Hz) and higher stroke lengths of 1-3 mm may be suitable for macro textures and different geometric structures. In some embodiments, the controller may further control actuator 228 to vibrate at a predetermined range of amplitudes and frequencies, for emulating micro textures. In some embodiments, the controller may combine a control of vibration of actuator 228 with a control of stroke length or frequency of actuator 228.

Figure 3B:
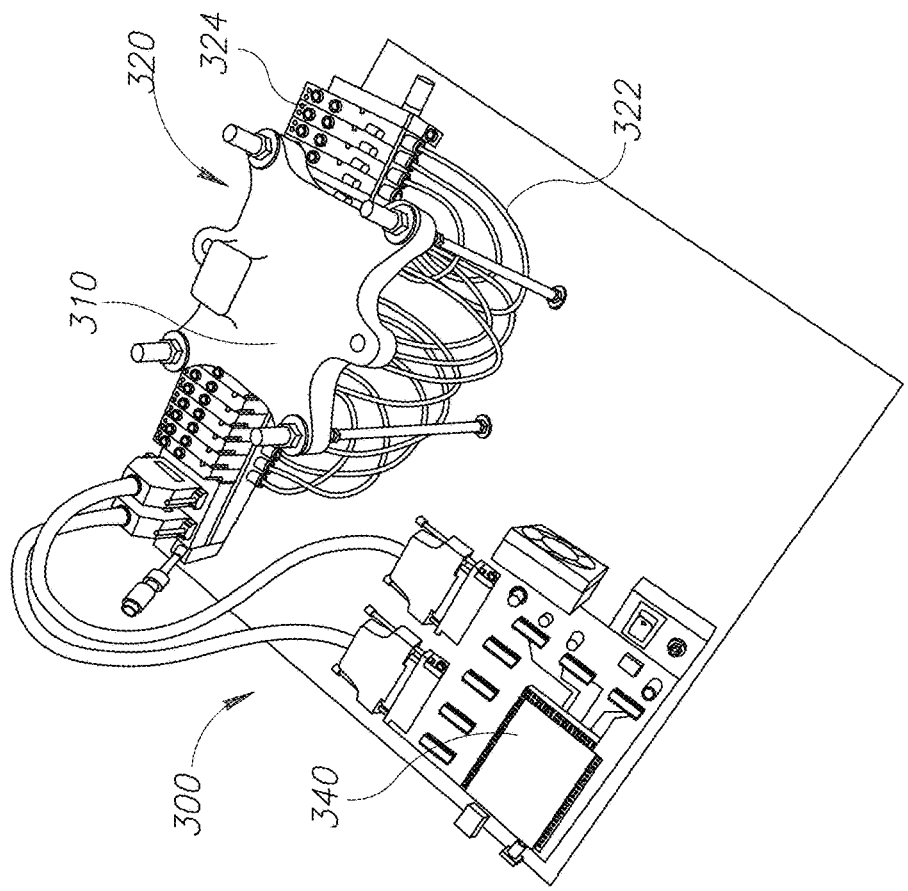
FIG. 3B is an image of the haptic feedback device, according to some embodiments of the present invention, illustrated in FIG. 3A.
Figure 3A:
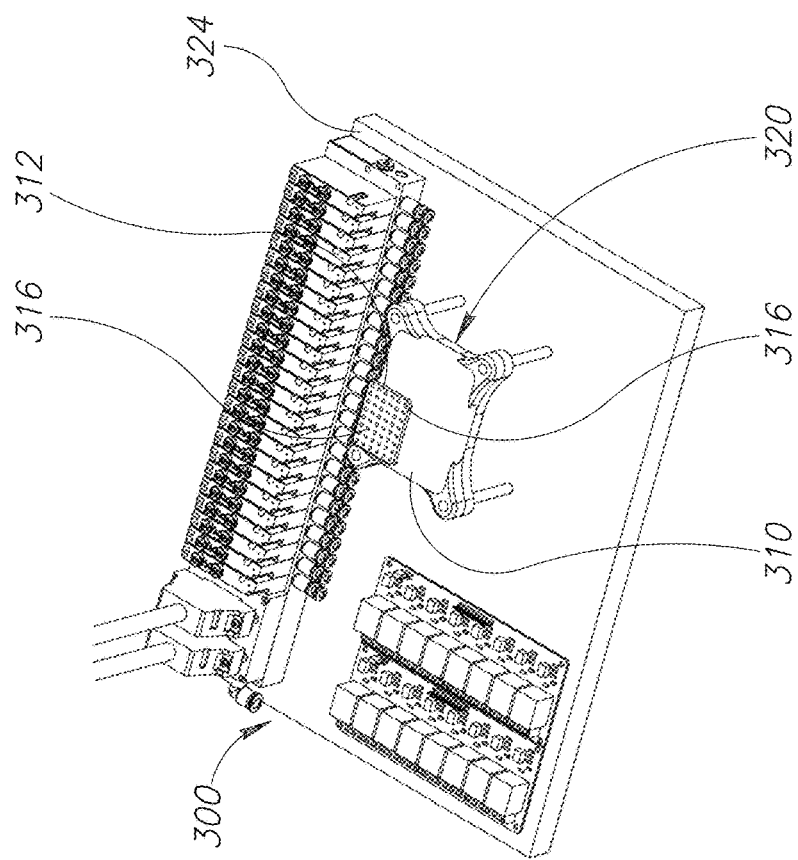
FIG. 3A is an illustration of a haptic feedback device according to some embodiments of the present invention.

Reference is now made to FIGS. 3A and 3B which show a nonlimiting example, of a haptic feedback device 300 according to some embodiments of the invention. The haptic feedback device 300 may include, at least one texture emulator 320, a housing 310 at least partially contains the texture emulator and a controller 340. In some embodiments, controller 340 may be included in a printed circuit board (PCB), as shown in FIG. 3B, and may include at least some of the components of controller 140 (in FIG. 1).

In some embodiments, housing 310 may have a perforated texture emulating surface 312 with a plurality of micro-holes 316. In some embodiments, the housing may further include tunnels or tubes leading to each micro-hole 316 (as illustrated). In some embodiments, at least one texture emulator 320 may include a plurality of tubes 322, each tube is connected from one end to one of micro-holes 316 in housing 310 and from the other end to a valve 324. In some embodiments, at least one texture emulator 320 may further include a pressurized gas supplier (not illustrated) configured to supply pressurized gas to each tube 322 and controller 340 may be configured to control one or more of the valves 324 to provide gas to be ejected from one or more of micro-holes 316 according to the received instructions.

Figure 4B:
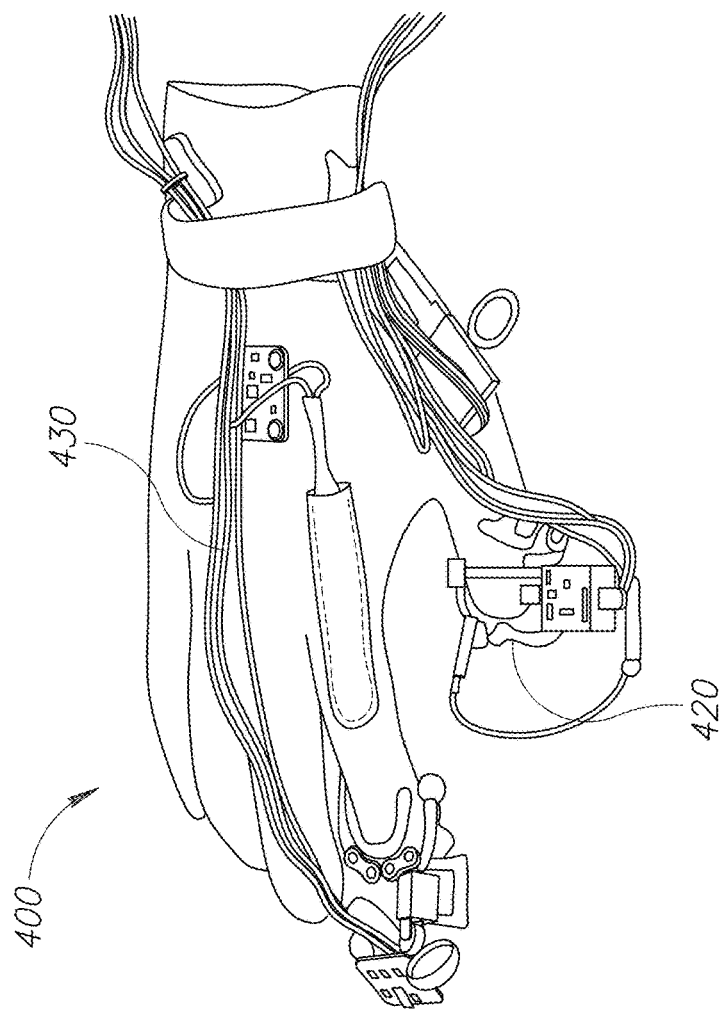
FIG. 4B is an image of a motion tracking glove that includes the haptic feedback device illustrated in FIG. 4A.
Figure 4A:
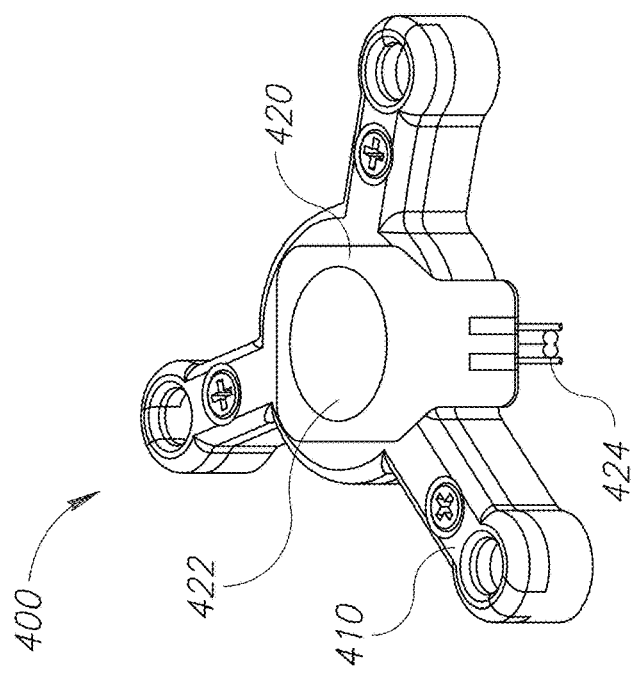
FIG. 4A is an illustration of a haptic feedback device according to some embodiments of the present invention.

Reference is now made to FIGS. 4A and 4B which show a nonlimiting example, of a haptic feedback device according to some embodiments of the invention. A haptic feedback device 400 may include, at least one texture emulator 420, a housing 410 at least partially contains the texture emulator and a controller (e.g., controller 140 illustrated in FIG. 1). In some embodiments, at least one texture emulator 420 may include a contact surface 422 and a vibration motor (not illustrated) connected to contact surface 422 by connectors 424 configured to deliver the vibration to surface 422. In some embodiments, the controller may be configured to control a frequency and amplitude of the vibration motor based on the received instructions.

In some embodiments, haptic feedback device 400 may further include a motion tracking glove 430 (e.g., a carrying device), and at least one texture emulator 420 may be mounted on one or more fingers of glove 430. For example, two texture emulators 420 may be mounted on the thumb and the index finger of glove 430, as illustrated. In some embodiments, different texture emulators may be mounted on each finger of glove 430, for example, texture emulators 120, 220, 320 and 520.

Figure 5B:
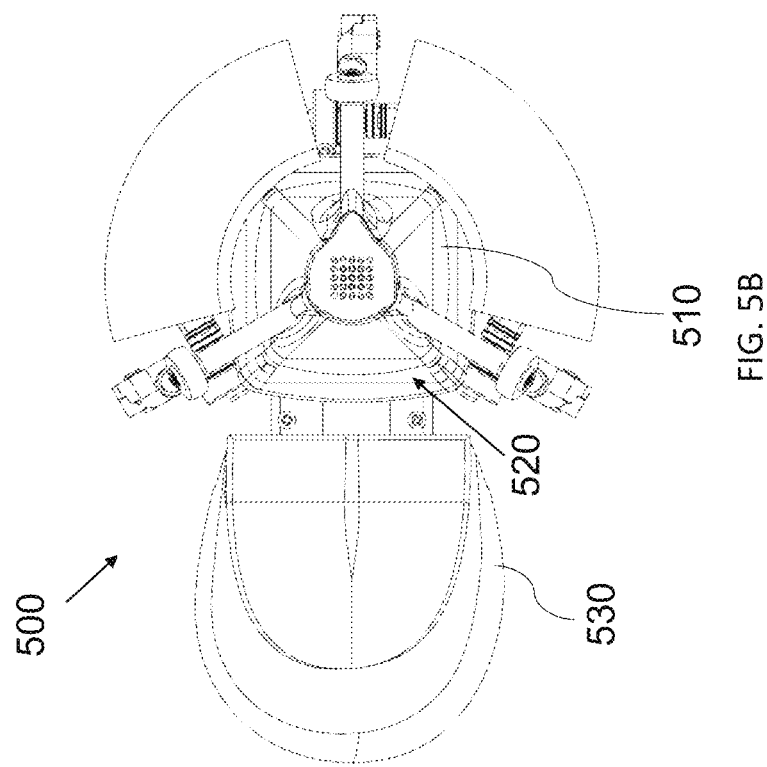
FIG. 5B is an image of the haptic feedback device of FIG. 5A mounted on a mouse.
Figure 5A:
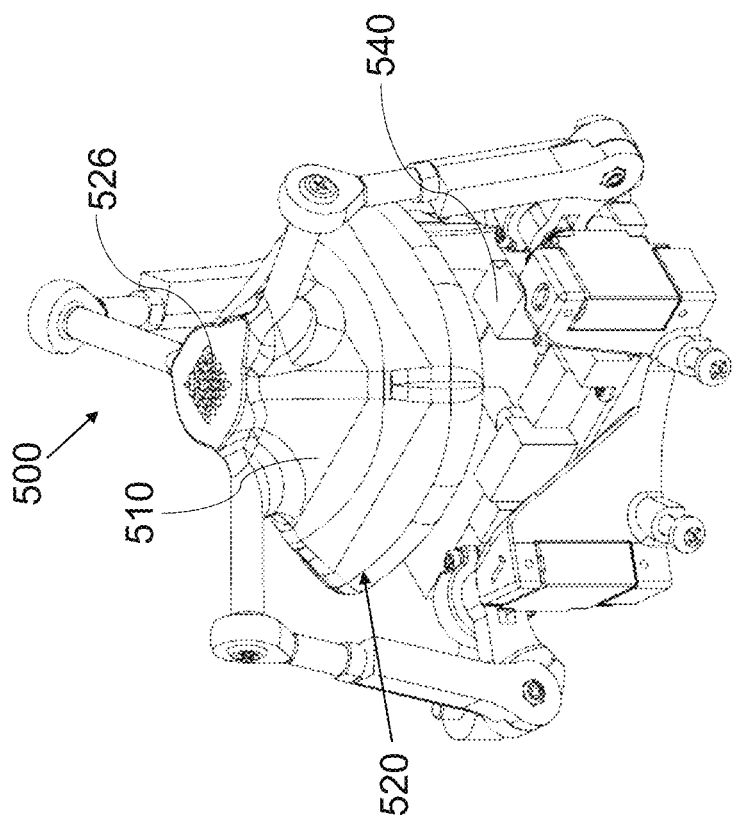
FIG. 5A in an illustration of a haptic feedback device according to some embodiments of the present invention.

Reference is now made to FIGS. 5A and 5B which show a nonlimiting example of a haptic feedback device according to some embodiments of the invention. A haptic feedback device 500 may include, at least one texture emulator 520, a housing 510 at least partially containing the texture emulator and a controller 540. In some embodiments, controller 540 may be included in a printed circuit board (PCB), as shown in FIG. 5B, and may include at least some of the components of controller 140 (in FIG. 1). Texture emulator 520 and housing 510 may be substantially the same as texture emulator 220 and housing 210, as illustrated, thus may include substantially the same components. In some embodiments, texture emulator 520 and housing 510 may be mounted on a computer input device, selected from: computer mouse 530 (as illustrated), keyboard, joystick and the like. In some embodiments, any other texture emulators, and housings according to embodiments of the invention may be mounted to the computer input device.

In some embodiments, controller 540 may control texture emulator 520 to provide the required texture sensation in response to an image or a video displayed on a screen associated with the computer input device. For example, texture emulator 520 may provide a user using mouse 530, a sense of textures displayed on the screen at the location a cursor is located on the screen.

Figure 6B:
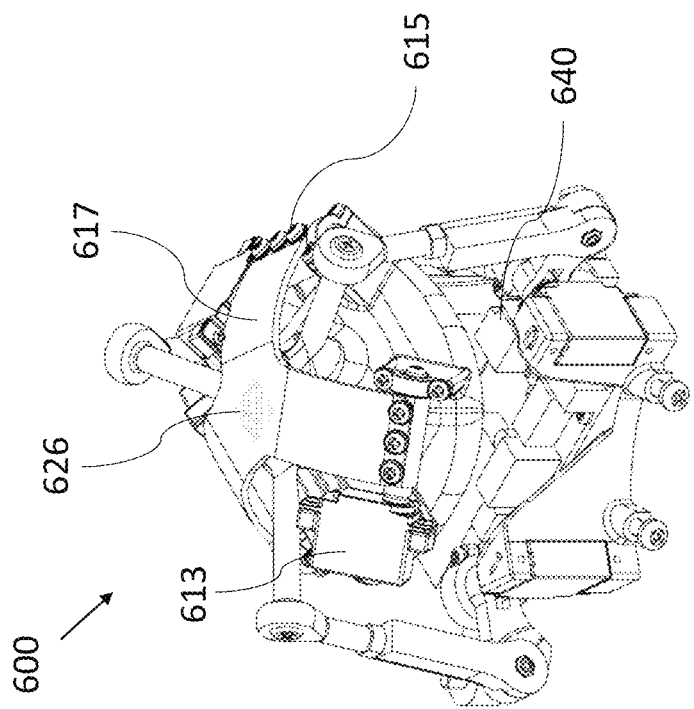
FIGS. 6A and 6B show illustrations of a haptic feedback device according to some embodiments of the present invention.
Figure 6A:
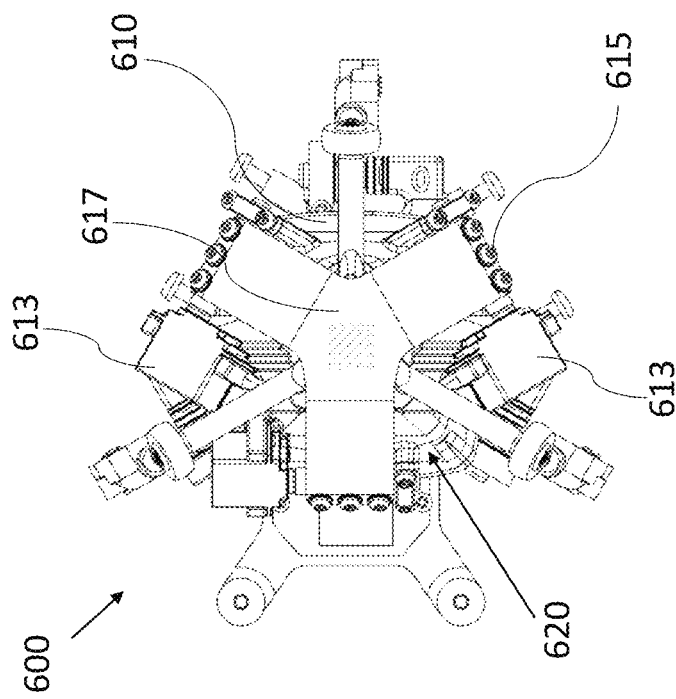

Reference is now made to FIGS. 6A and 6B which show a nonlimiting example of a haptic feedback device according to some embodiments of the invention. A haptic feedback device 600 may include, at least one texture emulator 620, a housing 610 at least partially containing the texture emulator and a controller 640. In some embodiments, controller 640 may include at least some of the components of controller 540 (in FIG. 5A). In some embodiments, device 600 may include substantially the same components as devices 200 and 500, for example, texture emulator 620 and housing 610 may be substantially the same as texture emulator 520 and housing 510, as illustrated.

In some embodiments, device 600 may include at least one DC motor 613 mounted on housing 610. In some embodiments, a solenoid actuator 615 may be connected to each DC motor 613, and further connected to a flexible layer 617. In some embodiments, each DC motor 613 is capable of actuating a solenoid 615, wherein solenoid 615 is capable of moving the flexible layer 617. In some embodiments, flexible layer 617 may cover the tips of rods 626, wherein rods 626 are substantially the same as rods 226 of device 200. In some embodiments, flexible layer 617 may move in two directions parallel to the plane of a texture emulating surface in contact with the user's body, providing a shear texture sensation to the surface in contact. In some embodiments, a shear texture sensation may be achieved by actuating at least one solenoid 615 to move flexible layer 617 to move in two directions parallel to the plane of the texture emulating surface in contact with the user's body.

In some embodiments, haptic feedback devices 100, 200, 300, 400, 500 and 600 may be included in a variety of applications. For example, the haptic feedback devices may be included in gaming consoles alongside with virtual and augmented reality headsets to enhance user experience. In another example, the haptic feedback devices may be included in an E-commerce experience, to allow customers to virtually touch products before purchasing them online. For example, before buying a jacket one can feel the texture of the fabric in addition to seeing it on the website.

In some embodiments, haptic feedback devices 100, 200, 300, 400, 500 and 600 may be included in medical applications. For example, the devices may be used as a medical robotic rehabilitation system for upper-limb rehabilitation. As part of the rehabilitation process, patients are required to exercise gestures by interacting with objects. The VR/AR setup will allow the physician to control the properties of the objects and tune the feedback according to the patient's progress. In addition, the virtual environment may allow replacing boring routine exercises with entertaining virtual interactions. In another example, the devices may be used for training physicians in a virtual environment thus improving the training quality and reducing training costs. In yet another example, the devices may be used for remote medical diagnosis, for example by incorporating a sensing device to measure tissue mechanical properties and conveying the information to the physicians. In yet another example, the devices may be incorporated in robotic assisted minimal invasive surgery and improve outcome by enhancing the information provided to the surgeon.

In some embodiments, devices 100, 200, 300, 400, 500 and 600 may be used in technical training, remote diagnosis and maintenance of machines. Augmented reality has already started being incorporated in recent years in technical training and machine maintenance, thus, the devices may be incorporated in these processes.

In some embodiments, devices 100, 200, 300, 400, 500 and 600 may be used to convey Braille or other information to blind\blind-deaf people. The devices may be used on a regular computer as shown at the end of the previous section, illustrated in FIG. 5B, or wearable for other applications.

Reference is now made to FIG. 7 which is a flowchart of a method of controlling a haptic feedback device according to some embodiments of the invention. The method of FIG. 7 may be performed by any suitable controller, for example, controllers 140, 340 and 540. In step 710, instructions to provide a texture sensation may be received. For example, the controller may receive the instruction from an external computing device, e.g., a computing device associated with a gaming console, a computing device associated with e-commerce website, a computing device associated with an online library books (e.g., in Braille) and the like.

In step 720, the texture emulator may be controlled to apply force to at least one location on a surface based on the received instructions. For example, the controller may control one or more of actuators 228 of texture emulator 220 or actuators (e.g., actuators 228 illustrated in FIGS. 2B and 2C) of texture emulator 520 to provide one or more predetermined linear movements to one or more rods 226 to form one or more strokes. The formed strokes may stimulate the user's mechanoreceptors thus may cause the user a texture sensation (e.g., in one or more finger cushions). In another example, the controller may control valves 324 of texture emulator 320 to provide one or more holes 316 with a stream of gas. The one or more stream of gases may stimulate the user's mechanoreceptors. In yet another example, the controller may control the vibration motors of texture emulator 420 to vibrated contact surface 422 in order to stimulate the user's mechanoreceptors.

In some embodiments, the method may further include receiving a location of the texture emulator and determining the texture sensation based on the location of the texture emulator. For example, the controller may receive a location of texture emulators attached to a motion tracking glove included in a physician training device and determine the required texture sensation based on a virtual location in a virtual organ the physician training device simulating. In another example, the controller may receive from a mouse a location in an online book which will determine the Braille texture to be form by the texture emulator.

In some embodiments, the method may further include controlling a three degrees of freedom (DoF) manipulator configured to apply surface orientation and normal forces to a surface of the housing holding at least a portion of the texture emulator. For example, the controller may control electric motors included in DoF manipulator 230 to tilt texture emulating surface 212 and/or apply normal force to a surface (e.g., a finger cushion) attached to texture emulating surface 212.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A haptic feedback device, comprising:
   at least one texture emulator;
   a housing at least partially containing the texture emulator;
   a three degrees of freedom (DoF) manipulator configured to manipulate the housing to apply surface orientation and normal forces to a surface of a user;
   a motion tracking device; and
   a controller configured to:

receive instructions to provide a texture sensation; and
control the texture emulator to apply force to at least one location on a surface based on the received instructions.

2. The haptic feedback device of claim 1, wherein the at least one texture emulator comprises:
an array of actuators, each configured to provide a linear stroke to a respective haptic rod; and
wherein the housing is configured to hold the array of actuators and rods, allowing each rod to extend from an opening in a surface of the housing when provided with a linear movement, and wherein the controller is configured to control one or more actuators from the array to provide required strokes.

3. The haptic feedback device of claim 2, wherein each actuator in the array is located at a known location in the array and designed to provide the linear movement in a specific angle with respect to the surface.

4. The haptic feedback device of claim 2, wherein the controller is configured to:
determine linear movements for at least some of the actuators in the array based on the received texture sensation; and
control at least some of the actuators in the array to provide one or more linear movements to form the sensation of the required texture.

5. The haptic feedback device of claim 2, wherein each actuator comprises:
a metallic coil,
a static magnet;
a floating magnet;
a static cover attached to the static magnet; and
an anti-magnetic cover attached to the floating magnet and configured to be connected to the haptic rod.

6. The haptic feedback device of claim 2, wherein the actuators may provide a frequency of up to 200 Hz.

7. The haptic feedback device of claim 2, further comprising a flexible layer, connected to three DC motors, the flexible layer covering the tips of the haptic rods.

8. The haptic feedback device of claim 1, wherein the housing comprises a plurality of micro-holes; and
wherein the at least one texture emulator comprises:
a plurality of tubes, each tube is connected from one end to one of the micro-holes in the housing and from the other end to a valve;
and a pressurized gas supplier configured to supply pressurized gas to each tube,
and wherein the controller is configured to control one or more of the valves to provide gas to be ejected from one or more of the micro-holes according to the received instructions.

9. The haptic feedback device of claim 1, wherein the texture emulator comprises:
a contact surface; and
a vibration motor connected to the contact surface,
and wherein the controller is configured to control a frequency and amplitude of the vibration motor based on the received instructions.

10. The haptic feedback device of claim 1, wherein the DoF manipulator comprises:
two or more arms pivotally connected to the housing and configured to apply normal force and to rotate the surface of the housing around axes parallel to the surface of the housing.

11. The haptic feedback device of claim 1, wherein the housing is mounted on a computer input device, selected from: a computer mouse, a keyboard, and a joystick.

12. The haptic feedback device of claim 1, further comprising a motion tracking glove, and wherein the at least one texture emulator is mounted on one or more fingers of the glove.

13. A method of controlling a haptic feedback device, comprising:
receiving instructions, from an external computing device, to provide a texture sensation; and
controlling a texture emulator, included in the haptic feedback device, to apply force to at least one location on a surface based on the received instructions,
wherein the haptic feedback device comprises:
at least one texture emulator;
a housing at least partially containing the texture emulator;
a motion tracking device; and
a controller.

14. The method of claim 13, further comprising:
controlling a three degrees of freedom (DoF) manipulator, included in the haptic feedback device, to apply surface orientation and normal forces to a surface of a user.

15. A texture emulator, comprising:
a texture emulating surface;
a motion tracking device; and
an array of actuators, each configured to provide a linear stroke to a respective haptic rod, wherein the haptic rod is configured to provide a sensation of texture,
and wherein each rod extends from an opening in the texture emulating surface when provided with a linear movement.

16. The texture emulator of claim 15, wherein each actuator in the array is located at a known location in the array and designed to provide the linear movement in a specific angle with respect to the texture emulating surface.

17. The texture emulator of claim 15, wherein each actuator comprises:
a metallic coil,
a static magnet;
a floating magnet;
a static cover attached to the static magnet; and
an anti-magnetic cover attached to the floating magnet and configured to be connected to the haptic rod.

* * * * *